US007300962B2

(12) United States Patent
Ratner et al.

(10) Patent No.: US 7,300,962 B2
(45) Date of Patent: Nov. 27, 2007

(54) HYDROGELS FORMED BY NON-COVALENT LINKAGES

(75) Inventors: Buddy D. Ratner, Seattle, WA (US); Prabha D. Nair, Kerala (IN); Maximiliane Silvia Boeckl, Seattle, WA (US); Elizabeth Reeves Leber, Seattle, WA (US)

(73) Assignee: University of Washington, Seattle, WA (US)

( * ) Notice: Subject to any disclaimer, the term of this patent is extended or adjusted under 35 U.S.C. 154(b) by 157 days.

(21) Appl. No.: 11/199,613

(22) Filed: Aug. 9, 2005

(65) Prior Publication Data

US 2005/0276857 A1 Dec. 15, 2005

Related U.S. Application Data

(62) Division of application No. 10/339,777, filed on Jan. 9, 2003, now Pat. No. 6,949,590.

(60) Provisional application No. 60/347,522, filed on Jan. 10, 2002.

(51) Int. Cl.
*C08J 3/03* (2006.01)
(52) U.S. Cl. .......................... 522/9; 522/33; 522/175; 522/185; 522/904; 522/905; 522/916
(58) Field of Classification Search ................ 392/346; 219/530; 126/263.05; 524/831, 916; 522/9, 522/33, 175, 183, 904, 905, 23, 916
See application file for complete search history.

(56) References Cited

U.S. PATENT DOCUMENTS

| | | | |
|---|---|---|---|
| 4,143,203 A | 3/1979 | Rigopulos et al. | |
| 4,410,442 A | 10/1983 | Lucas et al. | |
| 4,668,506 A | 5/1987 | Bawa | |
| 5,541,234 A | 7/1996 | Unger et al. | |
| 6,044,201 A | * | 3/2000 | Van Turnhout ............. 392/346 |

OTHER PUBLICATIONS

Hassan, C.M., and N.A. Peppas, "Structure and Morphology of Freeze/Thawed PVA Hydrogels," *Macromolecules* 33:2472-2479, 2000.
Kobayashi, M., et al., Preliminary Study of Polyvinyl Alcohol-Hydrogel (PVA-H) Artificial Meniscus, *Biomaterials* 24:639-647, 2003.
Lai, M.C., et al., "Chemical Stability of Peptides in Polymers. 1. Effect of Water on Peptide Deamindation in Poly(Vinyl Alcohol) and Poly(Vinyl Pyrrolidone) Matrixes," *J. Pharm. Sci.* 88(10):1073-1080, Oct. 1999.
Li, J.K., et al., "Poly(Vinyl Alcohol) Nanoparticles Prepared by Freezing-Thawing Process for Protein/Peptide Drug Delivery," *J. Controlled Release* 56:117-126, 1998.
Mallapragada, S.K., and N.A. Peppas, "Dissolution Mechanism of Semicrystalline Poly(Vinyl Alcohol) in Water," *J. Polymer Sci.* 34(Pt B):1339-1346, 1996.

Mandal, T.K., and L.A. Bostanian, "Effect of Peptide Loading and Surfactant Concentration on the Characteristics of Physically Crosslinked Hydrogel," *Pharm. Dev. Tech.* 5(4)555-560, 2000.
Mandal, T.K., et al., "Poly(d,1-Lactide-Co-Glycolide) Encapsulated Poly(Vinyl Alcohol) Hydrogel as a Drug Delivery System," *Pharm. Res.* 19(11):1713-1719, Nov. 2002.
Sarti, B., and M. Scandola, "Viscoelastic and Thermal Properties of Collagen/Poly(Vinyl Alcohol) Blends," *Biomaterials* 16(10):785-792, 1995.
Schmedlen, R.H., et al., "Photocrosslinkable Polyvinyl Alcohol Hydrogels That Can Be Modified With Cell Adhesion Peptides for Use in Tissue Engineering," *Biomaterials* 23:4325-4332, 2002.
Stammen, J.A., "Mechanical Properties of a Novel PVA Hydroge in Shear and Unconfined Compression," *Biomaterials* 22:799-806, 2001.
Suzuki, Y., et al., "A New Drug Delivery System With Controlled Release of Antibiotic Only in the Presence of Infection," *J. Biomed. Mat. Res.* 42:112-116, 1998.
Takahashi, N., et al., "Effects of Cononsolvency on Gelation of Poly(Vinyl Alcohol) in Mixed Solvents of Dimethyl Sulfoxide and Water," *Polymer* 44:4075-4078, 2003.
Xiao, C., and G. Zhou, "Synthesis and Properties of Degradable Poly(Vinyl Alcohol) Hydrogel," *Polymer Degradation and Stability* 81:297-301, 2003.
Hassan, C.M., and N.A. Peppas, "Structure and Morphology of Freeze/Thawed PVA Hydrogels," *Macromolecules* 33:2472-2479, 2000.
Kobayashi, M., et al., Preliminary Study of Polyvinyl Alcohol-Hydrogel (PVA H) Artifical Meniscus, *Biomaterials* 24:639-647, 2003.
Lai, M.C., et al., "Chemical Stability of Peptides in Polymers. 1. Effect of Water on Peptide Deamindation in Poly(Vinyl Alcohol) and Poly(Vinyl Pyrrolidone) Matrixes," Journal of Pharmaceutical Sciences 88(10):1073-1080, Oct. 1999.
Li, J.K., et al. "Poly(Vinyl Alcohol) Nanoparticles Prepared by Freezing-Thawing Process for Protein/Peptide Drug Delivery," Journal of Controlled Release 56:117-126, 1998.
Mallapragada, S.K., and N.A. Peppas, "Dissolution Mechanism of Semicrystalline Poly(Vinyl Alcohol) in Water," Journal of Polymer Science: Part B: Polymer Physics 34:1339-1346, 1996.

(Continued)

*Primary Examiner*—Robert D. Harlan
(74) *Attorney, Agent, or Firm*—Christensen O'Connor Johnson Kindness PLLC

(57) ABSTRACT

In one aspect, the present invention provides hydrogels comprising polymer molecules and bridging molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. In some embodiments, the polymer molecules are poly(vinyl alcohol) (PVA) and the bridging molecules are amino acids. Some embodiments of the invention provide devices comprising hydrogels, and pharmaceutical compositions comprising biologically active molecules within hydrogels. Another aspect provides methods for forming hydrogels of the invention.

32 Claims, 3 Drawing Sheets

OTHER PUBLICATIONS

Mandal, T.K., and L.A. Bostanian, "Effect of Peptide Loading and Surfactant Concentration on the Characteristics of Physically Crosslinked Hydrogel," Pharmaceutical Development and Technology 5(4):555-560, 2000.

Mandal, T.K., et al., "Poly(d,1-Lactide-Co-Glycolide) Encapsulated Poly(Vinyl Alcohol) Hydrogel as a Drug Delivery System," Pharmaceutical Research 19(11):1713-1719, Nov. 2002.

Sarti, B., and M. Scandola, "Viscoelastic and Thermal Properties of Collagen/Poly(Vinyl Alcohol) Blends," Biomaterials 16(10):785-792, 1995.

Schmedlen, R.H., et al., "Photocrosslinkable Polyvinyl Alcohol Hydrogels That Can Be Modified With Cell Adhesion Peptides for Use in Tissue Engineering," Biomaterials 23:4325-4332, 2002.

Stammen, J.A., "Mechanical Properties of a Novel PVA Hydroge in Shear and Unconfined Compression," Biomaterials 22:799-806, 2001.

Suzuki, Y., et al., "A New Drug Delivery System With Controlled Release of Antibiotic Only in the Presence of Infection," Journal of Biomedical Materials Research 42:112-116, 1998.

Takahashi, N., et al., "Effects of Cononsolvency on Gelation of Poly(Vinyl Alcohol) in Mixed Solvents of Dimethyl Sulfoxide and Water," Polymer 44:4075-4078, 2003.

Xiao, C., and G. Zhou, "Synthesis and Properties of Degradable Poly(Vinyl Alcohol) Hydrogel," Polymer Degradation and Stability 81:297-301, 2003.

* cited by examiner

HYDROGELS FORMED BY NON-COVALENT LINKAGES

CROSS-REFERENCE TO RELATED APPLICATION

This application is a divisional of U.S. patent application Ser. No. 10/339,777, filed Jan. 9, 2003 (now U.S. Pat. No. 6,949,590), which claims the benefit of U.S. Provisional Application No. 60/347,522, filed Jan. 10, 2002, under 35 U.S.C. § 119.

GOVERNMENT RIGHTS

This invention was made with government support under EEC-9529161 awarded by the National Science Foundation Engineering Research Center. The government has certain rights in the invention.

FIELD OF THE INVENTION

The present invention relates to biocompatible hydrogels.

BACKGROUND OF THE INVENTION

Hydrogels are formed by creating bridges between and within polymer chains through the attachment of small bridging molecules to the functional moieties of the polymer backbone, a process known as cross-linking. The structural integrity of conventional hydrogels is based upon the covalent chemistry used for the cross-linking, which typically requires catalysts to facilitate the reactions in a timely fashion. The presence of catalysts impedes the medical use of hydrogels, especially in surgical applications, because they are potentially injurious to surrounding tissues. Thus, there is a need for hydrogels that can be polymerized rapidly without the use of chemical cross-linking catalysts.

SUMMARY OF THE INVENTION

In one aspect, the present invention provides hydrogels comprising polymer molecules and bridging molecules, wherein substantially all the polymer molecules are cross-linked by hydrogen bonds between polymer molecules and bridging molecules, wherein each bridging molecule is linked to at least two polymer molecules and wherein there are substantially no covalent linkages between the polymer molecules. The polymer molecules are typically neutral polymer molecules with a high density of regularly-spaced hydroxyl groups. Exemplary polymer molecules include poly(vinyl alcohol) (PVA), hydroxyethyl acrylate, polyglyceryl acrylate, acrylic co-polymers (e.g., TRISACRYL), and polysaccharides. The bridging molecules are typically capable of forming at least two hydrogen bonds. Exemplary bridging molecules include molecules with at least one of a carboxylic acid group or an amino group. In some embodiments, the bridging molecules are selected from the group consisting of amino acids, succinic acid, and ethylene diamine.

The hydrogels of the invention are useful in any situation in which a hydrogel is useful. For example, the hydrogels of the invention can be used to make implantable medical devices wherein the hydrogel portion(s) of the device includes biologically active molecules (e.g., drugs useful for treating a disease in a mammal). In some embodiments of the implantable medical devices the biologically active molecules are not covalently linked to the hydrogel. In these embodiments, the biologically active molecules are released from the hydrogel after the device is implanted into a living body. Thus, these embodiments of implantable medical devices can be used, for example, as drug delivery devices that release an amount of a drug that is effective to ameliorate the symptoms of a disease in a living body, such as a mammalian body (e.g., a human body).

In some embodiments, the invention provides devices comprising a hydrogel, wherein the hydrogel comprises polymer molecules and bridging molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. In some embodiments, the devices of the invention further comprise a device body, wherein the hydrogel is attached to the device body. In some embodiments, the devices are medical devices.

In some embodiments, the devices of the invention are in the form of pharmaceutical compositions comprising polymer molecules, bridging molecules, and biologically active molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. Thus, the pharmaceutical compositions are useful for delivering biologically active molecules (e.g., therapeutic agents) to a living body, such as a mammalian body (e.g., a human body).

In another aspect, the invention provides methods for forming a hydrogel. The methods comprise combining polymer molecules and bridging molecules to form a hydrogel, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. The polymer molecules are typically neutral polymer molecules with a high density of regularly-spaced hydroxyl groups. Exemplary polymer molecules include poly(vinyl alcohol) (PVA), hydroxyethyl acrylate, polyglyceryl acrylate, acrylic co-polymers (e.g., TRISACRYL), and polysaccharides. The bridging molecules are typically capable of forming at least two hydrogen bonds. Exemplary bridging molecules include molecules with at least one of a carboxylic acid group or an amino group. In some embodiments, the bridging molecules are selected from the group consisting of amino acids, succinic acid, and ethylene diamine. The methods of this aspect of the invention are useful for forming the hydrogels of the present invention.

Some embodiments provide methods for forming a hydrogel at a site of application are provided. The methods for forming a hydrogel at a site of application comprise combining polymer molecules and bridging molecules at the site of application to form a hydrogel, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. The methods of this aspect of the invention are useful, for example, for forming hydrogels at the site of a wound in a living body, such as a mammalian body (e.g., a human body). The hydrogel may fill in, or repair, a missing or damaged portion of tissue, and/or may deliver biologically active molecules (e.g., therapeutic agents) to a damaged portion of a living body, thereby promoting wound healing. In some embodiments, the methods of this aspect of the invention may be used to apply stem cells, included within a hydrogel of the invention, to a damaged portion of a living body. The stem cells thereafter divide and differentiate to form cells and tissue that repair the damaged portion of the living body.

Further embodiments provide methods of making a pharmaceutical composition comprising a hydrogel and biologically active molecules. The methods of making a pharmaceutical composition comprise combining biologically active molecules with polymer molecules and bridging molecules to form a hydrogel comprising the biologically active molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. The pharmaceutical compositions of the invention are useful, for example, for delivering therapeutic agents to a living body in need thereof (e.g., for delivering an amount of a drug effective to treat a disease afflicting a living body, such as a mammalian body).

In another aspect, the invention provides methods for administering biologically active molecules to a subject, comprising administering to the subject biologically active molecules in a hydrogel of the invention. Some embodiments provide methods for injecting biologically active molecules, comprising the steps of: (a) applying a layer of hydrogel to a site of injection, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules; and (b) injecting biologically active molecules through the hydrogel layer. An advantage of the methods of this aspect of the invention is that the injected molecules are prevented, by the layer of hydrogel, from escaping from the site of injection after the needle, or other instrument used to inject them, is removed.

A further aspect provides kits for forming the hydrogels of the invention. The kits comprise polymer molecules, bridging molecules, and instructions for forming a hydrogel. The instructions provide protocols for combining the polymer molecules and bridging molecules to form a hydrogel wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. Thus, for example, the kits of the invention can be used to form the hydrogels of the invention. For example, in some embodiments, the kits can be used to form a hydrogel in the methods of the invention for forming a hydrogel at a site of application.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In one aspect, the present invention provides hydrogels comprising polymer molecules and bridging molecules, wherein substantially all the polymer molecules are cross-linked by hydrogen bonds between polymer molecules and bridging molecules, wherein each bridging molecule is linked to at least two polymer molecules and wherein there are substantially no covalent linkages between the polymer molecules.

It is a feature of the hydrogels of the invention that they do not rely on covalent bonds between polymer molecules to provide structural stability. The structural stability of the hydrogels of the invention is provided, for the most part, by the hydrogen bonds formed between bridging molecules and polymer molecules whereby the polymer molecules are cross-linked. Thus, each bridging molecule forms hydrogen bonds with at least two polymer molecules, thereby cross-linking the polymer molecules. Consequently, the hydrogels of the invention typically do not include any catalyst that is used in art-recognized processes for making hydrogels by covalently cross-linking polymer molecules. Many of these catalysts are toxic or otherwise deleterious to living cells or tissue. Thus, the hydrogels of the invention are typically more biocompatible than prior art hydrogels that include residual amounts of catalysts used to form covalent bonds between polymer molecules.

Figure 1:
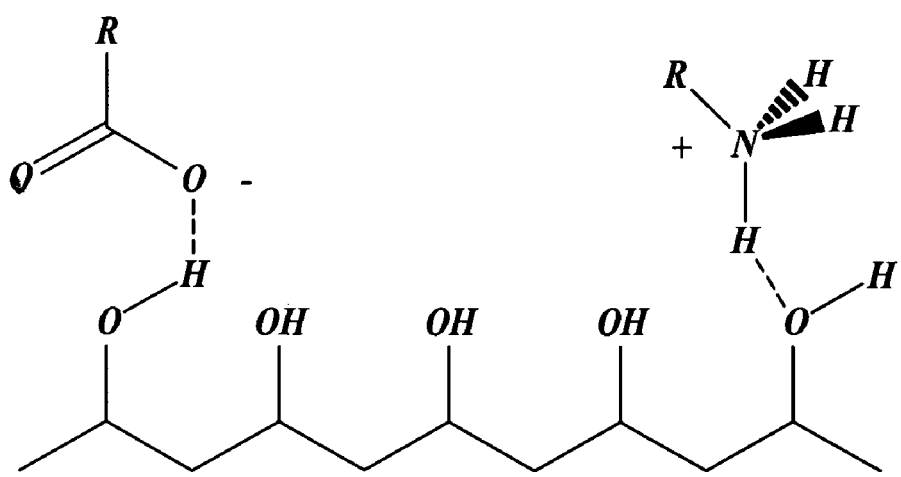
FIG. 1 shows a schematic representation of the hydrogen bonding between poly(vinyl alcohol) and both the amino group of glycine and the carboxyl group of glycine in a representative hydrogel of the invention (R=$CH_2$).

The polymer molecules are typically neutral molecules having a high density of regularly-spaced hydroxyl groups. Thus, the polymer molecule can be any polymer, natural or synthetic, in which there are regularly-spaced hydroxyl moieties that can form hydrogen bonds with a low molecular weight bridging molecule, for example as shown in FIG. 1. Suitable polymers include poly(vinyl alcohol) (PVA), hydroxyethyl acrylate, polyglyceryl acrylate, polysaccharides, and acrylic co-polymers such poly(N-tris[hydroxymethyl]methyl) acrylamide (e.g., TRISACRYL, Sigma/Aldrich).

In the hydrogels of the invention, the polymer molecules are cross-linked by hydrogen bonds between polymer molecules and bridging molecules, as shown, for example, in FIG. 1. Each bridging molecule is linked to at least two polymer molecules. Thus, the physical integrity of the hydrogel is dependent on the hydrogen bonds formed between the polymer molecules and the bridging molecules. There are substantially no covalent linkages between the polymer molecules, although some covalent linkages between the polymer molecules may form spontaneously at a low rate. Thus, typically no more than about 1% (more typically no more than about 0.1%) of the polymer molecules are linked by one or more covalent bonds.

The bridging molecule can be any low molecular weight molecule (m.w. <1000) that can form at least two hydrogen bonds with the polymer molecules. As used herein, the term "low molecular weight molecule" refers to a molecule with a molecular weight that is less than 1000. At least two hydrogen bonds are necessary to connect two different polymer molecules in order to obtain cross-linking. The bridging molecule typically includes one or more carboxylic acid groups and/or one or more amino groups. Thus, many low molecular weight molecules are suitable for use in the invention, such as naturally-occurring or synthetic amino acids. Representative examples of useful amino acids include: threonine, serine, tyrosine, phenylalanine, proline, histidine, glycine, lysine, alanine, arginine, cysteine, tryptophan, valine, glutamine, and aspartic acid, as described in EXAMPLE 3. Suitable bridging molecules may also include other zwitterionic molecules, or any molecule that comprises at least one of a carboxylic acid group or an amino group, such as succinic acid or ethylene diamine, as described in EXAMPLE 4.

In some embodiments, the bridging molecule is an amino acid or a mixture of amino acids, as described in EXAMPLES 1-3. Both L- and D-isomers of amino acids can be included in the hydrogels of the invention, as shown in EXAMPLE 3. Many useful functional groups can be inserted into the hydrogel by virtue of the chemistry of the side chain of amino acids. This offers the means to covalently immobilize proteins, drugs and other biologically active molecules that interact with cells migrating into the gel from surrounding tissue. The functional groups on the amino acid side chains can be chemically coupled by a variety of common chemistries, including, but not limited to, carbodiimides, aryl azides, and succinimidyl esters or carbonyldiimidazole derivatization. Hydrolyzable linkage chemistry or reversible modifications could also be employed for local or systemic delivery of biologically active molecules.

Covalent linkages can be formed between any suitable chemical groups present in amino acid molecules within the hydrogels of the invention. For example, amino acids that are easily derivatizable at their side chains include aspartic acid, glutamic acid, lysine, arginine, cysteine, histidine, tyrosine, methionine and tryptophan. These nine amino acids contain the following eight principal functional groups that can be covalently linked: primary amines ($NH_2$), carboxylate (COOH), sulfhydryls or disulfides (SH or S-S), thioethers (found in methionine), imidazolyls (found in histidine), guanidinyl groups (found in arginine), phenolic (found in tyrosine), and indolyl (found in tryptophan). These functional groups can be covalently linked using any suitable chemical reaction, such as the methods disclosed in Hermanson, *Bioconjugate Techniques*, Academic Press (1996), which publication is incorporated herein by reference. Other amino acids, such as asparagine, glutamine, threonine, and serine may also be covalently link through amide and/or hydroxyl functional groups, as described in Hermanson, *Bioconjugate Techniques*, Academic Press (1996).

Desired properties of the hydrogels of the invention can be obtained, for example, by varying stoichiometric ratio of the polymer and the bridging molecule, as described in EXAMPLE 2. In general, hydrogels comprising higher concentrations of bridging molecules are firmer than hydrogels comprising lower concentrations of bridging molecules. Thus, hydrogels comprising PVA and amino acids generally increase in firmness with increasing amino acid concentration, as shown in EXAMPLE 1. As used herein, the term "firm hydrogel" refers to a hydrogel that retains its shape. Typically, a firm hydrogel may be squeezed or pinched, however, it will bounce back to its original form when released. The term "soft hydrogel" refers to a hydrogel that is a viscous liquid or has a toothpaste-like consistency. A soft hydrogel typically adapts the form of the container it is in. For example, a hydrogel formed with PVA and glycine at a ratio of 0.304 (PVA:Gly, w/w) has a soft "toothpaste" consistency, whereas a hydrogel formed with PVA and glycine at a ratio of 0.201 (PVA:Gly, w/w) is firm and rubbery. On the other hand, a hydrogel formed with PVA and tryptophan at a ratio of 12.5 (PVA:Trp, w/w) is firm and rubbery. Thus, the ratio of polymer to bridging molecule used to make a firm or a soft hydrogel varies according to the polymer molecule and bridging molecules used. Suitable ratios of polymer molecules to bridging molecules to provide hydrogels of a desired consistency can readily be determined empirically, as described in EXAMPLES 1-3.

In some embodiments, the invention provides devices comprising a hydrogel, wherein the hydrogel comprises polymer molecules and bridging molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules.

Figure 2:
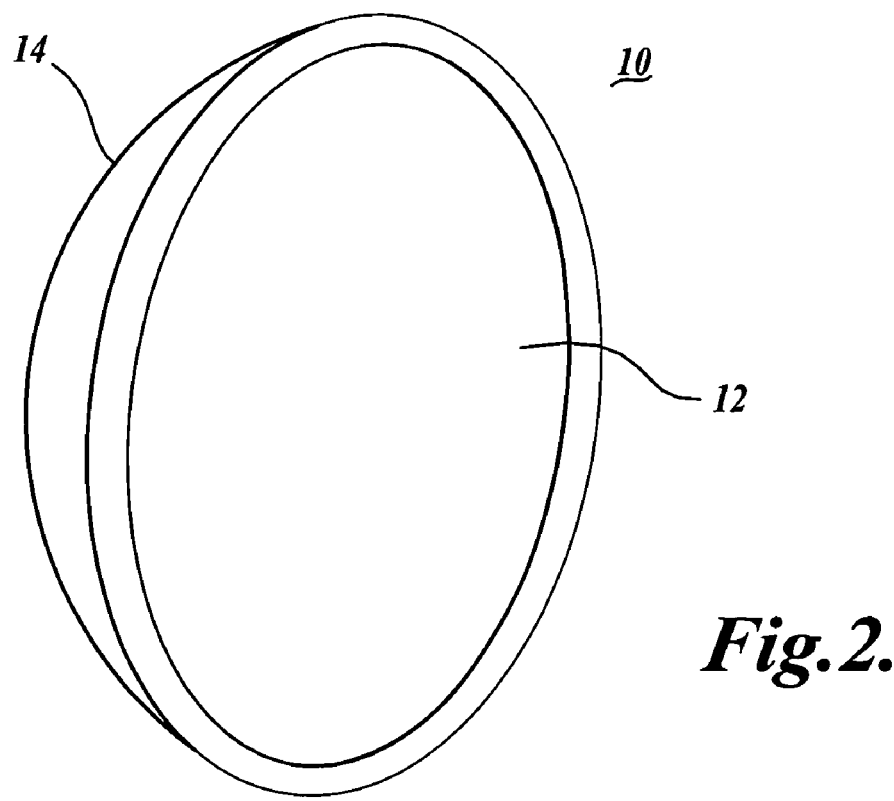
FIG. 2 shows a representative shaped hydrogel article of the invention, a contact lens.

The devices comprising a hydrogel may include, but are not limited to, pill and gel formulations, films at material surfaces, ointments for topical use, and shapes that conform to the contours of the surface (e.g., a body part) that they are applied to (e.g., shapes that are wound-filling or defect-filling). FIG. 2 shows a representative device of the invention, in the form of a contact lens 10 having an inner surface 12 and an outer surface 14.

Figure 3:
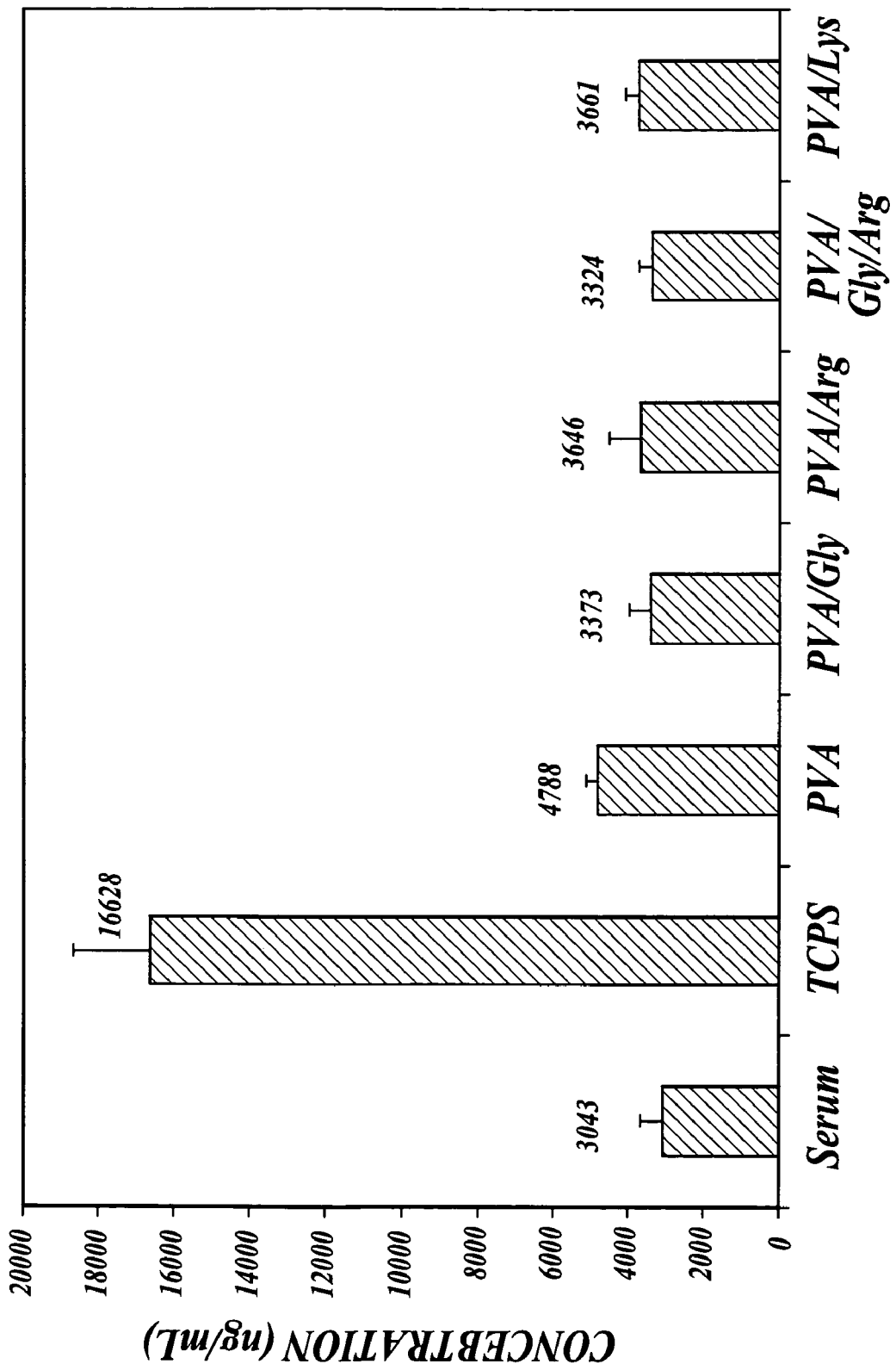
FIG. 3 shows a graph representing the extent of complement activation by representative hydrogels of the invention, measured as the amount of SC5b-9 present as described in EXAMPLE 5.

Some hydrogels of the invention provide excellent integration with surrounding tissue upon implantation in vivo, as described in EXAMPLE 5. These hydrogels are biocompatible and elicit no or minimal unfavorable responses, such as inflammation, foreign body encapsulation, or complement system activation (FIG. 3, EXAMPLE 5). The hydrogels of the invention can be manufactured from raw materials that have been accepted as safe for medical use by the United States Pharmacopia (USP). Accordingly, they may be used for a variety of medical applications including, but not limited to, surgical adhesives, sealants, and barriers, coatings, lubricants, adhesion-preventing formulations, transducers for ultrasound imaging from both outside and within the body during surgery, hemostasis control materials, and medical device coatings. An exemplary use of a hydrogel of the invention to create a barrier to prevent the extrusion of biologically active molecules from the site of injection is provided in EXAMPLE 7.

Some embodiments of the devices of the invention provide implantable delivery systems for drugs, biologicals and other biologically active molecules. An exemplary pharmaceutical composition for delivery of biologically active molecules to a subject is described in EXAMPLE 6. The pharmaceutical compositions of the invention can be used to immobilize covalently a variety of proteins, drugs, and other biologically active molecules for presentation to the surrounding cells that invade the gel. Controlled delivery of drugs and other biologically active molecules, such as DNA, RNA, or proteins can be achieved by using hydrolyzable linkages or reversible modifications.

In some embodiments, the invention provides devices in the form of pharmaceutical compositions, comprising biologically active molecules in a hydrogel of the invention. Administration of the pharmaceutical compositions of the invention is accomplished by any effective route, e.g., orally or parenterally. Methods of parenteral delivery include topical, intra-arterial, subcutaneous, intramedullary, intravenous, or intranasal administration. In addition to one or more biologically active molecules, the pharmaceutical compositions may contain suitable pharmaceutically acceptable carriers comprising excipients and other compounds that facilitate administration of the biologically active molecules to a subject. Further details on techniques for formulation and administration may be found in the latest edition of "Remington's Pharmaceutical Sciences" (Maack Publishing Co, Easton Pa.).

In some embodiments, the devices of the invention further comprise a device body, wherein the hydrogel is attached to the device body. Some embodiments provide medical devices comprising a device body and a hydrogel of the invention attached to the device body. The hydrogel may be immobilized onto (or within) a surface of an implantable or attachable medical device body. The modified surface will typically be in contact with living tissue after implantation into an animal body. As used herein, "implantable or attachable medical device" refers to any device that is implanted into, or attached to, tissue of an animal body, during the normal operation of the device (e.g., implantable drug delivery devices). Such implantable or attachable medical device bodies can be made from, for example, nitrocellulose, diazocellulose, glass, polystyrene, polyvinylchloride, polypropylene, polyethylene, dextran, Sepharose, agar, starch, and nylon. Linkage of the hydrogel to a device body can be accomplished by any technique that does not destroy the desired properties of the hydrogel. For example, hydrogels comprising amino acids may be attached to the device body through functional groups of the amino acids. A surface of an implantable or attachable medical device body can be modified to include functional groups (e.g., carboxyl, amide, amino, ether, hydroxyl, cyano, nitrido, sulfanamido, acetylinic, epoxide, silanic, anhydric, succinimic, azido) for hydrogel immobilization thereto. Coupling chemistries include, but are not limited to, the formation of esters, ethers, amides, azido and sulfanamido derivatives, cyanate and other linkages to the functional groups available on the hydrogels.

In some embodiments, a surface of a device body that does not possess useful reactive groups can be treated with radio-frequency discharge plasma (RFGD) etching to generate reactive groups (e.g., treatment with oxygen plasma to introduce oxygen-containing groups; treatment with propyl amino plasma to introduce amine groups). When an RFGD glow discharge plasma is created using an organic vapor, deposition of a polymeric overlayer occurs on the exposed surface. RFGD plasma deposited films offer several unique advantages. They are smooth, conformal, and uniform. Film thickness is easily controlled and ultrathin films (10-1000 Angstroms) are readily achieved, allowing for surface modification of a material without alteration to its bulk properties. Moreover, plasma films are highly-crosslinked and pin-hole free, and therefore chemically stable and mechanically durable. RFGD plasma deposition of organic thin films has been used in microelectronic fabrication, adhesion promotion, corrosion protection, permeation control, as well as biomaterials (see, e.g., U.S. Pat. No. 6,131,580).

Some medical devices of the invention are adapted to be implanted into the soft tissue of an animal, such as a mammal, including a human, during the normal operation of the medical device. Implantable medical devices of the invention may be completely implanted into the soft tissue of an animal body (i.e., the entire device is implanted within the body), or the device may be partially implanted into an animal body (i.e., only part of the device is implanted within an animal body, the remainder of the device being located outside of the animal body). Representative examples of completely implantable medical devices include, but are not limited to: cardiovascular devices (such as vascular grafts and stents), artificial blood vessels, artificial bone joints, such as hip joints, and scaffolds that support tissue growth (in such anatomical structures as nerves, pancreas, eye and muscle). Representative examples of partially implantable medical devices include: biosensors (such as those used to monitor the level of drugs within a living body, or the level of blood glucose in a diabetic patient) and percutaneous devices (such as catheters) that penetrate the skin and link a living body to a medical device, such as a kidney dialysis machine.

Some medical devices of the invention are adapted to be affixed to soft tissue of an animal, such as a mammal, including a human, during the normal operation of the medical device. These medical devices are typically affixed to the skin of an animal body. Examples of medical devices that are adapted to be affixed to soft tissue of an animal include skin substitutes, and wound or burn treatment devices (such as surgical bandages and transdermal patches).

Figure 4:
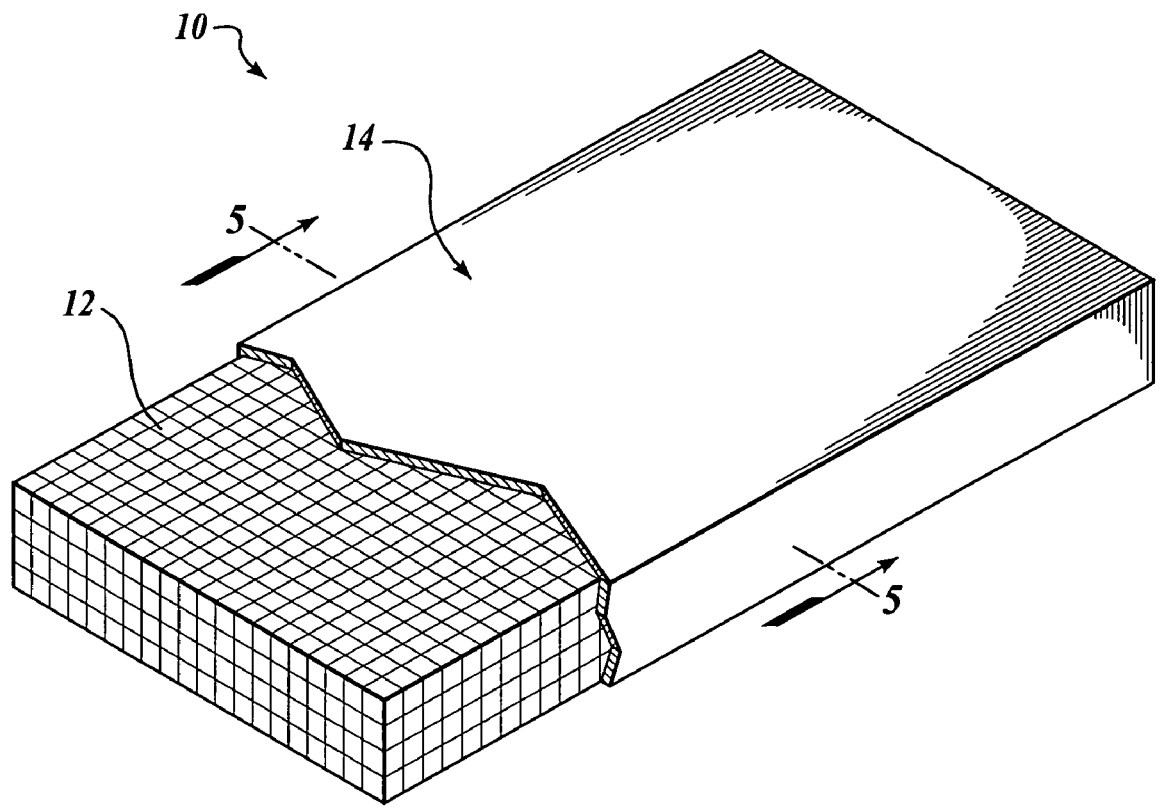
FIG. 4 shows a perspective view of a representative medical device of the invention with a portion of the hydrogel layer removed to expose the underlying device body.
Figure 5:
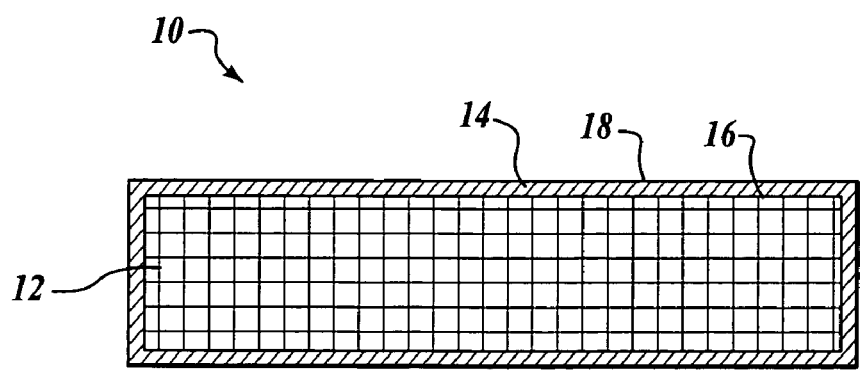
FIG. 5 shows a transverse cross-section of the medical device of FIG. 4.

FIG. 4 shows a representative medical device 10 of the present invention, in the form of an implantable drug delivery device, which includes a device body 12 to which is attached a hydrogel layer 14. In the embodiment shown in FIG. 4, hydrogel layer 14 has been partially removed to show device body 12 beneath. Device body 12 is indicated by hatching. As shown in the cross-sectional view of medical device 10 in FIG. 5, hydrogel layer 14 includes an internal surface 18, attached to device body 12, and an external surface 20.

Due to the biocompatibility of the hydrogels of the invention used in the construction of medical device 10, the presence of the hydrogel on the device body of a medical device will reduce or eliminate the foreign body response to the device body after implantation into, or attachment to, tissue of an animal body.

In some embodiments, the medical devices of the invention further comprise biologically active molecules within the hydrogel attached to the device body to provide for the controlled delivery of drugs and other biologically active molecules, such as DNA, RNA, or proteins. The biologically active molecules may be attached, covalently or non-covalently, to the bridging molecules (e.g., amino acids) and/or to the polymer molecules in the hydrogel. Examples of functional groups useful for covalently attaching biologically active molecules to amino acids present within the hydrogel include: primary amines ($NH_2$), carboxylate (COOH), sulfhydryls or disulfides (SH or S-S), thioethers, imidazolyls, guanidinyl groups, phenolic, and indolyl.

Any reactive functional group present on polymer molecules within the hydrogel can be used to covalently attach biologically active molecules to the hydrogel. The following publications, incorporated herein by reference, describe examples of technologies that are useful for attaching biologically active molecules to polymer molecules, such as the polymers present in the hydrogel of the present invention: Nuttelman et al. (2001) *J. Biomed. Mater. Res.* 57:217-223; Rowley et al. (1999) *Biomaterials* 20:45-53; Hubbel (1995)

Biotechnology 13:565-76; Massia & Hubbell (1990) Anal. Biochem 187:292-301; Drumheller et al. (1994) Anal. Biochem. 222:380-8; Kobayashi & Ikada (1991) Curr. Eye Res. 10:899-908; Lin et al. (1992) J. Biomaterial Sci. Polym. Ed. 3:217-227; and Bellamkonda et al. (1995) J. Biomed. Mater. Res. 29:663-71.

The biologically active molecules may also be introduced into the hydrogel by forming the hydrogel in the presence of the biologically active molecules, by allowing the biologically active molecules to diffuse into a hydrogel, or by otherwise introducing the biologically active molecules into the hydrogel (e.g., by injection, as described in EXAMPLE 6).

The biologically active molecules can be attached to every part of the device, or to only a portion of the device. For example, in some embodiments, that are adapted to be implanted into an animal, biologically active molecules that act to decrease the foreign body reaction (e.g., anti-inflammatory agents, and immunomodulatory agents) are attached only to the surface(s) of the device that is/are in contact with living tissue in the animal body. The biologically active molecules serve to decrease the foreign body reaction of the living body against the implanted structure.

In another aspect, the invention provides methods for forming a hydrogel. The methods comprise combining polymer molecules and bridging molecules to form a hydrogel, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules.

The polymer molecules are typically neutral molecules having a high density of regularly-spaced hydroxyl groups. Thus, the polymer molecule can be any polymer, natural or synthetic, in which there are regularly-spaced hydroxyl moieties that can form hydrogen bonds with a low molecular weight bridging molecule, as shown in FIG. 1. Suitable polymers include poly(vinyl alcohol) (PVA), hydroxyethyl acrylate, polyglyceryl acrylate, polysaccharides, and acrylic co-polymers such poly(N-tris[hydroxymethyl]methyl) acrylamide (e.g., TRISACRYL, Sigma/Aldrich).

The polymer molecules are cross-linked by hydrogen bonds between polymer molecules and bridging molecules, as shown, for example, in FIG. 1. Each bridging molecule is linked to at least two polymer molecules, and there are substantially no covalent linkages between the polymer molecules. Typically, no more than about 1% of the polymer molecules are covalently linked (more typically no more than about 0.1% of the polymer molecules are covalently linked).

The bridging molecule can be any low molecular weight molecule that can form at least two hydrogen bonds with the polymer molecules. The bridging molecule typically includes one or more carboxylic acid groups and/or one or more amino groups. Thus, many low molecular weight molecules are suitable for use in the invention, such as naturally-occurring or synthetic amino acids. Representative examples of useful amino acids include: threonine, serine, tyrosine, phenylalanine, proline, histidine, glycine, lysine, alanine, arginine, cysteine, tryptophan, valine, glutamine, and aspartic acid, as described in EXAMPLE 3. Suitable bridging molecules also include other zwitterionic molecules, or any molecule that comprises at least one of a carboxylic acid group or an amino group, such as succinic acid or ethylene diamine, as described in EXAMPLE 2.

In some embodiments, the bridging molecule is an amino acid or a mixture of amino acids, as described in EXAMPLES 1-3. Virtually any naturally occurring or synthetic amino acid can be employed to make the hydrogels of the invention. In some embodiments, hydrogels are formed by combining poly(vinyl alcohol) (PVA) solutions with glycine, bicine (N,N-bis(2-hydroxyethyl)glycine), glutamine, cysteine, arginine, lysine, histidine, and trans-4-hydroxyl proline, serine, methionine, or tryptophan. Mixtures of amino acids can also be used, such as glycine and lysine in combination with PVA, or glycine and arginine in combination with PVA, as described in EXAMPLE 4.

In some embodiments, hydrogels are formed by combining PVA and amino acids at a ratio of 8-200 mg of amino acids to 1 ml of 8-10% PVA. PVA is obtained from poly(vinyl acetate) through acid hydrolysis converting the acetate groups into alcohol functions. In some embodiments, the PVA is more than 80% hydrolyzed. In some embodiments, the PVA is more than 90% hydrolyzed. In some embodiments, the PVA is more than 95% hydrolyzed. Hydrogels are typically formed within 24 hours at room temperature, and may take up to a week to reach equilibrium. The basis for the hydrogel formation in the absence of catalyzed cross-linking lies, at least in part, in the ability of the amino acids to form hydrogen bonds with the OH groups in the PVA.

Both L- and D-isomers of amino acids can be included in the hydrogels of the invention, as shown in EXAMPLE 3. Many useful functional groups can be inserted into the hydrogels by virtue of the chemistry of the side chain of amino acids, as described above. This offers the means to covalently immobilize proteins, drugs and other biologically active molecules.

The invention provides methods for forming hydrogels having desired physical or chemical properties. As described above, useful functional groups can be inserted into the hydrogel by virtue of the chemistry of bridging molecules, such as the side chains of amino acids. Moreover, the desired physical properties of the hydrogels, such as gelling speed, firmness, and solubility, can be precisely adjusted by controlling the pH, the temperature, and the stoichiometric ratio of the polymer and the bridging molecule, as described in EXAMPLES 1 and 2. The affinity of the hydrogel for water, plasma, blood, and cellular components can also be varied by changing the nature and the ratio of the component molecules of the hydrogel. Thus, the conditions suitable for forming a hydrogel with the desired properties depend on the choice of bridging molecule, the ratio of polymer to bridging molecule, the pH, and the desired physical properties of the hydrogel.

The interaction between the polymer molecule and the bridging molecule occurs when the bridging molecule is deprotonated. Therefore, a suitable pH range for forming the hydrogel of the invention is the pH range at which most or all of the bridging molecules are deprotonated, as described in EXAMPLE 2. Accordingly, the choice of pH will depend on the nature of the bridging molecule(s) used for forming the hydrogel.

Hydrogels comprising both PVA and one or more amino acids are stable for several months in water, in contrast to hydrogels comprising PVA alone, which degrade after a few days. In general, hydrogels comprising higher concentrations of bridging molecules are firmer than hydrogels comprising lower concentrations of bridging molecules, as described in EXAMPLE 2. For example, a hydrogel formed with PVA and glycine at a ratio of 0.304 (PVA:Gly, w/w) has a soft "toothpaste" consistency, whereas a hydrogel formed with PVA and glycine at a ratio of 0.201 (PVA:Gly, w/w) is firm and rubbery. On the other hand, a hydrogel formed with PVA and tryptophan at a ratio of 12.5 (PVA:Trp, w/w) is firm and rubbery. Thus, the ratio of polymer to bridging molecule used to make a firm or a soft hydrogel varies according to the polymer molecule and bridging molecules used. Suitable ratios of polymer molecules to bridging molecules to provide hydrogels of a desired consistency can readily be determined empirically, as described in EXAMPLES 1-3.

In some embodiments, the invention provides methods for forming a hydrogel at a site of application. The methods for forming a hydrogel at a site of application comprise combining polymer molecules and bridging molecules at the site of application to form a hydrogel, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. The site of application refers to the place at or near where the hydrogel is to be applied. For example, the site of application may be in or on a subject, such as a human subject. According to the methods, instead of applying a previously formed hydrogel to the site, the hydrogel is formed at that site (in situ). The components of the hydrogel may be applied separately to the site of application and allowed to mix and gel in situ. Alternatively, the components may first be mixed and then applied to the site of application and allowed to gel in situ, as described in EXAMPLE 7. A hydrogel may be formed in situ, for example, by using a dual syringe or tube delivery assembly containing the components of the hydrogel in separate chambers. An exemplary embodiment of a dual syringe delivery assembly contains two syringes connected by a needle. The first syringe contains a polymer molecule solution and the second syringe contains a bridging molecule solution. The two solutions are combined by injecting, for example, the polymer molecule solution in the first syringe into the second syringe, then injecting the combined polymer molecule and bridging molecule in the second syringe into the first syringe. The injections from one syringe into the other syringe are continued until both solutions are mixed, after which the empty syringe is discarded, and the mixed solution is extruded through the needle.

Further embodiments provide methods of making a pharmaceutical composition comprising a hydrogel and biologically active molecules. The methods of making a pharmaceutical composition comprise combining biologically active molecules with polymer molecules and bridging molecules to form a hydrogel comprising the biologically active molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules. The methods comprise mixing the biologically active molecules with one or more components of the hydrogel before the hydrogel is formed. The methods may also comprise adding biologically active molecules to an already formed hydrogel. For example, the biologically active molecules may be absorbed into the hydrogel by osmosis, or they may be injected, as described, for example, in EXAMPLE 6.

Another aspect provides methods for administering the hydrogels of the invention. In some embodiments, the hydrogels comprise biologically active molecules. An exemplary method for administering a hydrogel comprising biologically active molecules is described in EXAMPLE 6.

Some embodiments provide methods for injecting biologically active molecules, comprising the steps of: (a) applying a layer of hydrogel to a site of injection, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules; and (b) injecting biologically active molecules through the hydrogel layer. An exemplary method for injecting biologically active molecules according to the invention is described in EXAMPLE 7.

The methods for administering a hydrogel include any route of administration, including oral and parenteral, such as topical, transdermal, nasal, vaginal, rectal, or sublingual routes of administration, intramuscular, sub-cutaneous, intravenous, and intraperitoneal. The hydrogels can be formulated in dosage forms appropriate for each route of administration.

Another aspect of the invention provides kits for forming the hydrogels of the invention. The kits comprise polymer molecules, bridging molecules, and instructions for forming one or more hydrogels of the invention. The polymer molecules and bridging molecules in the kit may be provided as a dehydrated or lyophilized mixture that can be reconstituted to form a hydrogel. The polymer molecules and bridging molecules may also be provided as solutions that may be combined to form a hydrogel. The instructions provided with the kit provide protocols for forming a hydrogel with the polymer molecules and bridging molecules provided in the kit. For example, there may be a chart listing applications types and appropriate ratios of polymer molecules and bridging molecules for each application. Some embodiments of the kit further provide a container in which the hydrogel may be formed. The container may be a mold, one or more syringes, or any other kind of container.

EXAMPLE 1

This Example describes the formation of representative hydrogels of the invention by combining poly(vinyl alcohol) and glycine or cysteine.

An 8% (w/v) solution of poly(vinyl alcohol) (PVA) (MW 86,000-140,000; Aldrich Chemicals, 99% hydrolyzed) had an approximate viscosity of 130 cps (Centipoise) at 23° C. as measured with a Brookfield Model DV-II digital viscometer employing a spindle number 31, and small sample adaptor, with a shear rate of 10 rpm. Addition of the amino acid glycine, dissolved in 2 ml water, to 10 ml of the 8% PVA solution caused gelation associated with a subsequent increase in viscosity in proportion to the amount of glycine added, as shown in Table 1. The viscosity was measured after 5 minutes of stirring and stabilization of the viscometer.

TABLE 1

Viscosity Changes During PVA/Gly Hydrogel Formation

| Amount of Glycine Added (g) | Viscosity (cP) |
| --- | --- |
| 0 | 130 |
| 0.25 | 153 |
| 0.4 | 159 |
| 0.5 | 144 |
| 0.75 | 192 |
| 0.9 | 186 |

In a second experiment, the PVA was re-precipitated with acetone to further purify it. Different ratios of an 8% solution of re-purified PVA and a 30% solution of glycine were combined in a total of 10 ml at room temperature. Viscosity measurements were taken 100 seconds after the two solutions were combined using a digital viscometer (Brookfield Model DV-II), spindle # 31 with a shear rate of 50 rpm, and the small adaptor. The viscosity measurements are provided in Table 2.

TABLE 2

Viscosity Changes During Hydrogel Formation with Re-Purified PVA/Gly

| Ratio of Gly:PVA (w/w) | Viscosity (cP) |
|---|---|
| 1 | 86 |
| 2 | 124 |
| 3 | 167 |
| 4 | 208 |
| 5 | 652* |

*shear rate had to be adjusted to 20 rpm

These experiments show that the viscosity of the hydrogel can easily be controlled by varying the ratio of PVA to glycine.

EXAMPLE 2

This Example describes that bridging molecules containing either a carboxylic acid or an amino group are capable of complexing with PVA to cause formation of representative hydrogels of the invention.

Two model compounds, succinic acid and ethylene diamine, were chosen, each of which only contained either two carboxylic acid groups (succinic acid) or two amino groups (ethylene diamine).

Succinic acid, ethylene diamine, and glycine were each dissolved in water at a typical ratio of 100 mg in 1 ml water. The pH of the compound solution (natural pH) was measured, and, if adjusted to a different pH (typically pH 4, 7, and 10), 5M $NaOH_{(aq)}$ or 5M $HCl_{(aq)}$ was added until the desired pH was reached.

Aliquots of 100 microliter of each solution were added to PVA to reach final concentrations of either ~0.5 mmol (low concentration) or ~1 mmol (high concentration) per 1 ml 8% PVA solution (1.8 mmol of available OH groups in PVA). PVA gels containing succinic acid and ethylene diamine were compared to PVA/glycine (PVA/Gly) gels prepared under similar conditions (see Table 3).

Control: As a control, 10 to 100 microliters of either 5M HCl or 5M NaOH were added to 1 ml of 8% PVA. The amounts added to PVA were similar to the volume of acid or base added to PVA. No gel formation was observed with acidic water. The basic solution causes PVA to thicken slightly. A little additional gelling was observed within 24 hours but it was not substantial.

Glycine: Glycine's natural pH is 6.78. At pH 4, little gel formation was observed initially; however, additional gel formation was observed within the first 24 hours.

At pH 7, substantial gelling was observed upon addition of glycine. More gelling was observed over time. At higher concentrations of glycine, immediate gel formation was observed with phase separation. The precipitated PVA was very soft and pliable, but was firmer if a higher concentration of glycine is used. The gel did not dissolve if it was allowed to cure for 1 hour in the solution it was made in before placing it in water. At pH 7, 2.6 mmol of glycine (2.6 mmol of each $COO^-$ and $NH_2$) is necessary to cause precipitation of 1 ml 8% PVA (1.8 mmol of available OH groups).

At pH 9.9, much gelling was observed upon initial addition. Considerable additional gelling was observed within 24 hours.

Succinic Acid: At pH 2.1, very slight gelling was observed after initial addition, however, the gelling dispersed easily with mixing. No additional gelling was observed with time.

At pH 7.0, there was some initial gelling when small amounts were added. A little more gelling was observed over time. At higher concentration of succinic acid, PVA precipitates out immediately upon addition of succinic acid, and the gel formed is typically in the form of a soft and white lump. This gel is similar to that obtained using glycine, however, the gel forms faster and is harder at end. The gel did not dissolve in water or in 1M HCl.

At pH 9.7, there was some initial gelling when small amounts are added. Additional gelling was observed over time. At higher concentration of succinic acid, PVA precipitates out immediately upon addition of succinic acid, and the gel formed is typically in the form of a soft and white lump. This gel is similar to that obtained using glycine, however, the gel forms faster and is harder at end. The gel did not dissolve in water or in 1M HCl. It took slightly less succinic acid than at pH 7 to initiate gel formation.

At pH 7, 0.85 mmol of succinic acid is necessary (1.7 mmol of $COO^-$) to cause precipitation of 1 ml 8% PVA (1.8 mmol of available OH groups). At pH 10, 0.73 mmol of succinic acid is necessary (1.5 mmol of $COO^-$) to cause precipitation of 1 ml 8% PVA (1.8 mmol of available OH groups).

Ethylene Diamine: At pH 4.4, no immediate gelling was observed, and there was no gelling over time. At pH 7.2, there was little immediate gelling, and no additional gelling with time. At pH. 10.0 and at pH 12.7, there was immediate gelling with lump upon mixing formation; and additional gelling occurred during the first 24 hours.

These results show that compounds only containing carboxylic groups will gel PVA. They can be more effective than amino acids. The carboxylic acid interacts with PVA when it is deprotonated and exists as $COO^-$. The results also show that compounds containing only amino groups result in gelling of PVA in a similar way as basic amino acids, such as lysine and arginine. The amino group interacts with PVA when it is in its deprotonated state, as $NH_2$.

TABLE 3

Gel Formation with Glycine, Succinic Acid and Ethylene Diamine.

|  | pH 2.1 | pH 4 | pH 7 | pH 10 | pH 13.1 |
|---|---|---|---|---|---|
| Glycine | n.t. | – | +++ | ++ | n.t. |
| Succinic Acid | – | – | +++ | +++ | n.t. |
| Ethylene Diamine | n.t. | – | – | ++ | +++ | n.t. = Compound was not tested at that pH;
+ = Gel formation, the more + the more gelling;
– = No gel formation was observed.

EXAMPLE 3

This Example describes studies showing that both D-amino acids and L-amino acids can be used to form hydrogels of the invention.

In these experiments, the ability of D-amino acids to gel PVA was compared directly to the gelling observed using L-amino acids. The concentrations of amino acids used were the same for both the L- and D-forms. All D- and L-amino acids were obtained from Aldrich. Typically, 100 mg of amino acid was dissolved in the minimum amount of water or 1M $NaHCO_3$ (200-600 microliter) necessary to dissolve it. Even with 600 microliter of solvent, some amino acids did not dissolve upon heating; in these cases, the supernatant of the solution was used. For each amino acid/PVA combination, 1 ml of 8% PVA was used (80 mg PVA) and the amount of amino acid was varied. 100 mg of each of amino acids was added unless listed below, with the following exceptions: L-Gln 20 mg; D-Ile 50 mg; L-Phe 20 mg and 40 mg; L-Pro 50 mg and 100 mg; L-Ser 30 mg and 100 mg; L-Thr 30 mg; D-Trp 10 mg and 30 mg; L-Trp 8 mg; L-Tyr 10 mg; D-Tyr 10 mg; L-Val 30 mg.

TABLE 4

Comparison of D- and L-Amino Acids for Forming Hydrogels

|  | L | D |
|---|---|---|
| Ala | + | − |
| Arg | √ | −* |
| Asn | + | − |
| Asp | − | − |
| Cys | + |  |
| Glu | − | − |
| Gln | + | − |
| Gly | √ |  |
| His | √ | − |
| Hyp | − |  |
| Ile | − | + |
| Leu | − | + |
| Lys | √ | √ |
| Met | − | + |
| Nle |  | + |
| Phe | + | + |
| Pro | √ | √ |
| Ser | + | √ |
| Thr | + | + |
| Trp | √ | + |
| Tyr | + | + |
| Val | + | + |

√ = Gel formation when amino acid was dissolved in water;
+ = Gel formation when amino acid was dissolved in 1 M $NaHCO_3$;
− = No gel formation regardless of solvent for amino acid;
* = HCl derivative of amino acid.

As shown in Table 4, some amino acids behave similarly, regardless of whether the L- or D-isomer is used. However, there is a significant number of amino acids that preferentially gel PVA as either the L- or the D-isomer.

EXAMPLE 4

This Example describes studies to investigate the interactions between the carboxylic acid and amino group of the amino acids and the hydroxyl groups of PVA.

As described in EXAMPLES 1-3, when solutions of PVA and amino acids are mixed, the system undergoes rapid gelation. This was unexpected because no chemical cross-linking or catalysis is required to produce the gel state. The only functional moieties available on the polymer are the hydroxyl (OH) groups and the only available groups on amino acids such as glycine and lysine are the α-amino ($-NH_2$), the carboxylate (COOH) and, in the case of lysine, the ε-amino ($-NH_2$) groups. The results obtained using succinic acid and ethylene diamine at different pHs support the idea that hydrogen bonding occurs between the carbonyl and/or amine groups of amino acids and the hydroxyl groups of PVA. To further test this hypothesis, nuclear magnetic resonance (NMR) and infrared spectroscopy (IR) was used to detect hydrogen bonding.

NMR spectroscopy is sensitive to influences of the chemical environment surrounding the atom of interest, either directly through the chemical bond or through space. In polymer chemistry, NMR may be used to indicate chemical bond interactions, such as hydrogen bonding, apparent by chemical shifts of all carbon atoms whose substituents are involved in the bond. $^{13}$C-NMR of PVA/Gly (1:1) hydrogels compared to PVA or glycine alone indicated the presence of hydrogen bonded COOH in PVA/Gly hydrogels, as shown in Table 5. Similar results were obtained with PVA/Arg (2:1) hydrogels, and PVA/Gly/Arg (formed using 480 mg PVA, 420 mg Gly, and 225 mg Arg in 7 ml water containing 1% $D_2O$). Spectra were obtained on a Bruker wm750, typically averaging >1024 scans. All amino acid solutions and hydrogels contained 1% $D_2O$. The chemical shifts were measured in ppm. All measurements were made 24 hours after the PVA and amino acid solutions were combined.

TABLE 5

NMR Spectra of Amino Acid Solutions and Hydrogels

|  | Carbonyl Carbon | |
|---|---|---|
| Gly Solution | 172.8 | |
| PVA/Gly Hydrogel | 171.8 | |
| Arg Solution | 183.5 | |
| PVA/Arg Hydrogel | 182.9 | |
| Gly Solution |  | 172.8 |
| Arg Solution | 183.5 | |
| PVA/Gly/Arg Hydrogel | 177.7 | 174.0 |

Similar to NMR spectroscopy, IR spectroscopy is sensitive to changes in the chemical environment. In particular, O—H, C—O, and N—H stretching modes are significantly influenced by such interactions as hydrogen bonding. These changes are observed by broadening of the OH stretch in the spectrum or by a shift of the signal as for the C═O stretch. In addition to these changes, appearance of overtone stretches from hydrogen bonding of the amine and the hydroxyl groups were observed in the PVA/aa spectra, as shown in Table 6. Therefore, the IR spectrum of PVA/Gly (1:1), PVA/Arg (2:1), PVA/Arg/Gly (480 mg PVA, 225 mg Arg, 420 mg Gly), and PVA/Lys (1:1) hydrogels indicated the presence of $NH_3^+$ hydrogen-bonding.

TABLE 6

Summary of IR Results

| Sample | OH Stretch | Overtones | $NH_3^+$ | C═O (free) | C═O (H-bonded) |
|---|---|---|---|---|---|
| PVA | 3650-2900 | − | − | − | − |
| Gly | 3350-2100 | − | − | 1677 | − |
| Arg | 3500-2750 | − | − | 1669 | 1627 |
| Lys | 3600-2350 | − | 2145 | − | 1585 |
| PVA/Gly | 3700-2350 | √ | 2130 | 1664 | 1618 |
| PVA/Arg | 3700-2350 | √ | − | 1676 | 1632 |
| PVA/Arg/Gly | 3650-2000 | √ | 2150 | − | 1618 (br) |
| PVA/Lys | 3650-2000 | √ | 2126 | − | 1562 (br) |

√ = Stretches observed in that region;
− = No stretch observed;
br = Broad stretch.

Therefore, characterization of PVA/aa hydrogels by NMR and IR supports the hypothesis that hydrogen bonding is responsible for the interaction between the carboxylic acid and amino group of the amino acids and the hydroxyl group of the PVA.

EXAMPLE 5

This Example describes the biocompatibility of representative hydrogels of the invention.

A hydrogel comprising PVA and glycine was prepared by measuring 1.14 mL of 8% PVA into a vial, and injecting 1 ml of a 30% glycine solution into the vial while mixing on a vortex. The hydrogel formed within less than 30 seconds. The hydrogel was top-loaded into a syringe and was injected into the biceps femoris of C57Bl/6 mice. The muscle was removed after 1, 2, 4, and 8 weeks after implantation and the tissue prepared for histological sectioning and staining. The tissue preparations showed that the PVA/Gly hydrogel did not elicit any unfavorable responses such as inflammation or foreign body encapsulation.

As another measure of biocompatibility, the amount of complement system activation of the PVA/amino acids (PVA/aa) hydrogels, in comparison to PVA and tissue culture polystyrene (TCPS) was examined. Results of this type of in vitro study, provide a general guide to the performance of the materials in vivo.

PVA and PVA/aa hydrogel films were prepared by casting 500 microliters of the final gel solution in a well of a 24-well plate. These were allowed to dry for 4-5 days, hydrated with water and incubated with 9% NaCl solution. The samples were incubated with human serum from a healthy donor for 90 min at 37° C. After addition of EDTA to a 10 mM final concentration, the serum was assayed for the presence of SC5b-9, which is the final membrane attack complex, resulting from both the classical and alternative pathway. As a negative control, serum was analyzed immediately after thawing the serum to avoid activation. TCPS was used as a positive control.

The results are provided in FIG. 3. The amount of complement activation observed for TCPS and PVA was comparable to what has been previously found (Black & Sefton (2000) *Biomaterials* 21(22):2287-94). No complement activation was observed using PVA/aa hydrogels. This study provides additional evidence that the PVA/aa hydrogels can be used as biocompatible materials in biomedical devices.

EXAMPLE 6

This Example describes local gene delivery using a representative hydrogel of the invention.

Qualitative gene transfer from a representative hydrogel of the invention comprising PVA and glycine (PVA/Gly) was observed in a murine model system of local gene delivery using the rAAV2-GFP vector. The right biceps femoris muscle of 12 female C57Bl/6 mice received approximately 40 microliter of PVA/Gly prepared as described in EXAMPLE 5, into which $1\times10^7$ transducing units of an adenovirus associated viral vector encoding green fluorescent protein vector (rAAV2-GFP) was injected. The left biceps femoris muscle received approximately 40 microliter of PVA/Gly alone. Mice were sacrificed at 1, 2, 4, and 8 weeks. Three mice were sacrificed at each time point. Following perfusion with 10 mL PBS, the biceps femoris muscles were dissected, rinsed with PBS, fixed in 4% paraformaldehyde for one hour, and embedded in OCT for frozen sectioning. Eight micrometer thick longitudinal sections were made. The slides were placed in paraformaldehyde for 10 minutes, rinsed with PBS, and cover-slipped with appropriate mounting media. Tissue sections were examined with fluorescence microscopy using a Nikon E800 upright microscope at 10×/0.45 using a FITC filter cube.

The tissue sections showed that there was significant GFP expression was at all time points in muscles injected with the vector compared to control muscles injected with PVA/Gly alone. The amount of GFP expression in muscles injected with the vector increased progressively over time.

EXAMPLE 7

This example describes the use of a representative hydrogel of the invention as a barrier to extrusion of fluid from a site of injection.

Cardiovascular disease is the leading cause of death in the United States and worldwide. Injection of biologics (e.g., therapeutic genes or stem/progenitor cells) into damaged heart tissue holds promise for treating myocardial ischemia by promoting angiogenesis and improving the functionality of damaged heart tissue. Minimally invasive surgery requires that biologics be delivered to a beating heart. However, back pressure, due to myocardial contraction, often extrudes a portion of therapy into the pericardial space, which raises significant efficacy and safety concerns. Given its properties, it was hypothesized that a hydrogel of the present invention would create a self-sealing barrier that would overcome the extrusion problem.

Initial studies involved testing the material as a "plug" just under the surface of the heart muscle through which biologics could be injected. Toward this end, PVA/Gly hydrogel prepared using 400 microliters of 8% PVA and 350 microliters of 30% glycine was injected under the epicardium using a 25-gauge needle. Then 3 microliters of saline dyed with bromophenol blue was injected through the viscous PVA/Gly hydrogel into heart muscle using a 30-gauge needle. In repeated attempts (both with hydrogels formed at about pH 6 and hydrogels formed at about pH 7), none of the dye-saline solution was extruded from the myocardium into the pericardial space.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for forming a hydrogel, comprising combining polymer molecules and bridging molecules to form a hydrogel wherein substantially all the polymer molecules are cross-linked by hydrogen bonds between polymer molecules and bridging molecules, wherein each bridging molecule is linked to at least two polymer molecules or between the polymer molecules and the bridging molecules.

2. The method of claim 1, wherein the polymer molecules are selected from the group consisting of poly(vinyl alcohol), hydroxyethyl acrylate, polyglyceryl acrylate, an acrylic co-polymer, and polysaccharides.

3. The method of claim 1, wherein the bridging molecules each comprise at least one of a carboxylic acid group or an amino group.

4. The method of claim 1, wherein the bridging molecules are selected from the group consisting of amino acids, succinic acid, and ethylene diamine.

5. The method of claim 1, consisting essentially of combining polymer molecules and bridging molecules to form a hydrogel, wherein substantially all the polymer molecules are cross-linked by hydrogen bonds between polymer molecules and bridging molecules there are substantially no covalent linkages between the polymer molecules.

6. The method of claim 5, wherein the polymer molecules are selected from the group consisting of poly(vinyl alcohol), hydroxyethyl acrylate, polyglyceryl acrylate, an acrylic co-polymer, and polysaccharides.

7. The method of claim 5, wherein the bridging molecules each comprise at least one of a carboxylic acid group or an amino group.

8. The method of claim 5, wherein the bridging molecules are selected from the group consisting of amino acids, succinic acid, and ethylene diamine.

9. The method of claim 1, consisting of combining polymer molecules are cross-linked by hydrogen bonds between polymer molecules and bridging molecules, wherein each bridging molecule is linked to at least two polymer molecules, and wherein there are substantially no covalent linkages between the polymer molecules.

10. The method of claim 9, wherein the polymer molecules are selected from the group consisting of poly(vinyl alcohol), hydroxyethyl acrylate, polyglyceryl acrylate, an acrylic co-polymer, and polysaccharides.

11. The method of claim 9, wherein the bridging molecules each comprise at least one of a carboxylic acid group or an amino group.

12. The method of claim 9, wherein the bridging molecules are selected from the group consisting of amino acids, succinic acid, and ethylene diamine.

13. A method for forming a hydrogel at a site of application, comprising combining polymer molecules and bridging molecules at a site of application to form a hydrogel wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules or between the polymer and molecules and the bridging molecules.

14. The method of claim 13, wherein the polymer molecules are selected from the group consisting of poly(vinyl alcohol), hydroxyethyl acrylate, polyglyceryl acrylate, an acrylic co-polymer, and polysaccharides.

15. The method of claim 13, wherein the bridging molecules each comprise at least one of a carboxylic acid group or an amino group.

16. The method of claim 13, wherein the bridging molecules are selected from the group consisting of amino acids, succinic acid, and ethylene diamine.

17. A method for making a pharmaceutical composition, comprising combining biologically active molecules with polymer molecules and bridging molecules to form a hydrogel comprising the biologically active molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules or between the polymer and molecules and the bridging molecules.

18. The method of claim 17, wherein the polymer molecules are selected from the group consisting of poly(vinyl alcohol), hydroxyethyl acrylate, polyglyceryl acrylate, an acrylic co-polymer, and polysaccharides.

19. The method of claim 17, wherein the bridging molecules comprise at least one of a carboxylic acid group or an amino group.

20. The method of claim 17, wherein the bridging molecules are selected from the group consisting of amino acids, succinic acid, and ethylene diamine.

21. A method for administering biologically active molecules to a subject, comprising administering to the subject biologically active molecules in a hydrogel, wherein the hydrogel comprises polymer molecules and bridging molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules or between the polymer and molecules and the bridging molecules.

22. The method of claim 21, wherein the polymer molecules are selected from the group consisting of poly(vinyl alcohol), hydroxyethyl acrylate, polyglyceryl acrylate, an acrylic co-polymer, and polysaccharides.

23. The method of claim 21, wherein the bridging molecules each comprise at least one of a carboxylic acid group or an amino group.

24. The method of claim 21, wherein the bridging molecules are selected from the group consisting of amino acids, succinic acid, and ethylene diamine.

25. A method for injecting biologically active molecules, comprising the steps of:
(a) applying a layer of hydrogel to a site of injection, wherein the hydrogel comprises polymer molecules and bridging molecules, wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules or between the polymer and molecules and the bridging molecules; and
(b) injecting biologically active molecules through the hydrogel layer.

26. The method of claim 25, wherein the polymer molecules are selected from the group consisting of poly(vinyl alcohol), hydroxyethyl acrylate, polyglyceryl acrylate, an acrylic co-polymer, and polysaccharides.

27. The method of claim 25, wherein the bridging molecules each comprise at least one of a carboxylic acid group or an amino group.

28. The method of claim 25, wherein the bridging molecules are selected from the group consisting of amino acids, succinic acid, and ethylene diamine.

29. A kit, comprising polymer molecules, bridging molecules, and instructions for forming a hydrogel, wherein the instructions provide protocols for combining the polymer molecules and bridging molecules to form a hydrogel wherein substantially all the polymer molecules are cross-linked by hydrogen bonds between polymer molecules and bridging molecules, wherein each bridging molecule is linked to at least two polymer molecules, and wherein there are substantially no covalent linkages between the polymer molecules or between the polymer and molecules and the bridging molecules.

30. The kit of claim 29, wherein the polymer molecules are selected from the group consisting of poly(vinyl alcohol), hydroxyethyl acrylate, polyglyceryl acrylate, an acrylic co-polymer, and polysaccharides.

31. The kit of claim 29, wherein the bridging molecules each comprise at least one of a carboxylic acid group or an amino group.

32. The kit of claim 29, wherein the bridging molecules are selected from the group consisting of amino acids, succinic acid, and ethylene diamine.

* * * * *

UNITED STATES PATENT AND TRADEMARK OFFICE
CERTIFICATE OF CORRECTION

PATENT NO. : 7,300,962 B2  Page 1 of 1
APPLICATION NO. : 11/199613
DATED : November 27, 2007
INVENTOR(S) : B.D. Ratner et al.

It is certified that error appears in the above-identified patent and that said Letters Patent is hereby corrected as shown below:

| COLUMN | LINE | ERROR |
| --- | --- | --- |
| 18 (Claim 1, | 48 line 6) | "molecules or between" should read --molecules, and wherein there are substantially no covalent linkages between the polymer molecules or between-- |
| 18 (Claim 5, | 64 line 5) | "molecules there are" should read --molecules, wherein each bridging molecule is linked to at least two polymer molecules, and wherein there are-- |
| 19 (Claim 9, | 10 line 2) | "polymer molecules are cross-linked" should read --polymer molecules and bridging molecules to form a hydrogel wherein substantially all the polymer molecules are cross-linked-- |

Signed and Sealed this

Sixth Day of May, 2008

JON W. DUDAS
*Director of the United States Patent and Trademark Office*